US012585053B2

(12) United States Patent
Martinez et al.

(10) Patent No.: US 12,585,053 B2
(45) Date of Patent: Mar. 24, 2026

(54) SCREEN PROVIDED WITH RETROREFLECTIVE MICROSTRUCTURES

(71) Applicant: Commissariat à l'Énergie Atomique et aux Énergies Alternatives, Paris (FR)

(72) Inventors: Christophe Martinez, Grenoble (FR); Yann Lee, Grenoble (FR)

(73) Assignee: Commissariat à l'Énergie Atomique et aux Énergies Alternatives, Paris (FR)

( * ) Notice: Subject to any disclaimer, the term of this patent is extended or adjusted under 35 U.S.C. 154(b) by 808 days.

(21) Appl. No.: 17/778,801

(22) PCT Filed: Oct. 14, 2020

(86) PCT No.: PCT/EP2020/078843
§ 371 (c)(1),
(2) Date: May 20, 2022

(87) PCT Pub. No.: WO2021/104739
PCT Pub. Date: Jun. 3, 2021

(65) Prior Publication Data
US 2022/0413193 A1      Dec. 29, 2022

(30) Foreign Application Priority Data
Nov. 27, 2019    (FR) ...................................... 1913341

(51) Int. Cl.
*G02B 5/124*        (2006.01)
*G03B 21/625*      (2014.01)
(52) U.S. Cl.
CPC ........... *G02B 5/124* (2013.01); *G03B 21/625* (2013.01)

(58) Field of Classification Search
None
See application file for complete search history.

(56) References Cited

U.S. PATENT DOCUMENTS

| | | | | |
|---|---|---|---|---|
| 5,734,501 | A | * | 3/1998 | Smith .................... G02B 5/124 |
| | | | | 359/530 |
| 2010/0073751 | A1 | | 3/2010 | Maekawa |
| 2017/0059862 | A1 | * | 3/2017 | Martinez .......... B29D 11/00625 |
| 2017/0197338 | A1 | | 7/2017 | Martinez et al. |
| 2018/0203244 | A1 | | 7/2018 | Hatanaka et al. |
| 2020/0098579 | A1 | * | 3/2020 | Varghese ............ H01L 21/0338 |
| 2021/0389658 | A1 | * | 12/2021 | Sun .................... G02B 19/0019 |

FOREIGN PATENT DOCUMENTS

| | | | | |
|---|---|---|---|---|
| EP | 2 770 364 A1 | | 8/2014 | |
| JP | 2009087938 A | * | 4/2009 | ........... H10K 59/878 |

OTHER PUBLICATIONS

PCT/EP2020/078843, Dec. 10, 2020, International Search Report and Written Opinion.
International Search Report and Written Opinion for International Application No. PCT/EP2020/078843, mailed Dec. 10, 2020.

* cited by examiner

*Primary Examiner* — Jyotsna V Dabbi
(74) *Attorney, Agent, or Firm* — Wolf, Greenfield & Sacks, P.C.

(57)                ABSTRACT

A retroreflective screen comprising including a film having a surface including a plurality of microrecesses, each microrecess having the shape of a truncated pyramid, the lateral walls and the back of each microrecess being coated with a reflective metallization.

15 Claims, 6 Drawing Sheets

SCREEN PROVIDED WITH RETROREFLECTIVE MICROSTRUCTURES

CROSS-REFERENCE TO RELATED APPLICATION

This application is a national stage filing under 35 U.S.C. § 371 of International Patent Application Serial No. PCT/EP2020/078843, filed Oct. 14, 2020, which claims priority to French patent application FR19/13341, filed Nov. 27, 2019. The contents of these applications are incorporated herein by reference in their entireties.

TECHNICAL BACKGROUND

The present application relates to the field of retroreflective screens. It more particularly aims at a screen provided with reflective microstructures in the form of cube corners adapted to such a system, at a method of forming such a screen, and at a mold for the forming of such a screen.

PRIOR ART

The applicant has already provided, in patent applications US2017059862 and US2017197338, screens provided with retroreflective microstructures in the form of cube corners, and methods of manufacturing such screens. The solutions described in these patent applications particularly enable to form partially transparent and partially retroreflective screens, adapted for applications of image projection on transparent surfaces such as windshields of vehicles, particularly of motor vehicles.

It would be desirable to at least partly improve certain aspects of the solutions described in the above-mentioned patent applications.

SUMMARY

An embodiment provides a retroreflective screen comprising a film having a surface comprising a plurality of microrecesses, each microrecess having the shape of a truncated pyramid, the lateral walls and the back of each microrecess being coated with a reflective metallization.

According to an embodiment, each microrecess comprises a back substantially parallel to the mean plane of the screen, corresponding to the summit surface of the truncated pyramid, and two first lateral walls substantially orthogonal to each other and substantially orthogonal to the back, corresponding to two lateral surfaces of the truncated pyramid.

According to an embodiment, each microrecess further comprises two second lateral walls inclined with respect to the mean plane of the screen, corresponding to two other lateral surfaces of the truncated pyramid.

According to an embodiment, each microrecess has an entrance aperture corresponding to the base of the truncated pyramid.

According to an embodiment, the base of the truncated pyramid is square-shaped.

According to an embodiment, the summit surface of the truncated pyramid is square-shaped.

According to an embodiment, the length on the side of the base of the truncated pyramid is substantially equal to twice the length on the side of the summit surface of the truncated pyramid.

According to an embodiment, the microrecesses all have substantially the same depth.

According to an embodiment, each microrecess is surrounded and laterally separated from the other microrecesses by a non-structured region of the film.

According to an embodiment, the reflective metallization does not extend above said non-structured region of the film.

According to an embodiment, the film is made of a transparent material.

According to an embodiment, the screen comprises a plurality of areas, each comprising a plurality of microrecesses, the microrecesses of a same area being the same dimensions, and the microrecesses of distinct areas having different dimensions.

According to an embodiment, the areas all are of same octagonal general shape and of same dimensions.

Another embodiment provides a mold for the manufacturing of a retroreflective screen such as defined hereabove, comprising, on the side of a surface, cavities of same shape as the microrecesses of the film of the screen.

Another embodiment provides a method of manufacturing a mold such as defined hereabove, comprising the successive steps of:

forming parallelepipedal cavities on the side of a surface of a substrate;

filling the cavities with resist;

illuminating the resist by means of a light beam inclined with respect to the back of the parallelepipedal cavities, so that a portion of the resist does not see the illumination beam; and removing the illuminated portion of the resist.

Another embodiment provides a method of manufacturing a retroreflective screen such as defined hereabove, comprising a step of molding of said surface of the film by means of a mold such as defined hereabove, followed by a step of deposition of a reflective metal layer all over said surface of the film.

According to an embodiment, the method further comprises a step of removal of the reflective metal layer outside of the microrecesses, by chemical-mechanical polishing.

BRIEF DESCRIPTION OF THE DRAWINGS

The foregoing features and advantages, as well as others, will be described in detail in the following description of specific embodiments given by way of illustration and not limitation with reference to the accompanying drawings, in which:

FIG. 2A illustrates a step of an example of a retroreflective screen manufacturing method according to an embodiment;

FIG. 2B illustrates another step of this method;

DESCRIPTION OF THE EMBODIMENTS

Like features have been designated by like references in the various figures. In particular, the structural and/or functional features that are common among the various embodiments may have the same references and may dispose identical structural, dimensional and material properties.

For the sake of clarity, only the steps and elements that are useful for an understanding of the embodiments described herein have been illustrated and described in detail. In particular, the various uses that may be made of the described retroreflective screens have not been detailed.

In the following disclosure, unless otherwise specified, when reference is made to absolute positional qualifiers, such as the terms "front", "back", "top", "bottom", "left", "right", etc., or to relative positional qualifiers, such as the terms "above", "below", "upper", "lower", etc., or to qualifiers of orientation, such as "horizontal", "vertical", etc., reference is made to the orientation shown in the figures.

Unless otherwise specified, the expressions "about", "approximately", "substantially", and "in the order of" signify within 10%, preferably within 5%, and more preferably still within 1%, or, when angular or the like values are concerned (for example, orientation qualifiers such as the terms parallel, orthogonal, vertical, horizontal, etc.), within 5 degrees, preferably to within degree, and more preferably still within 0.1 degree.

The above-mentioned patent applications US2017059862 and US2017197338, which are incorporated herein by reference, describe examples of an embodiment of a retroreflective screen comprising a film having a surface comprising a plurality of microrecesses, each microrecess having a back substantially parallel to the mean plane of the screen and first and second lateral walls substantially orthogonal to each other and substantially orthogonal to the back, the first and second lateral walls and the back of each microrecess meeting at a same point and forming a trihedron. These screens are designed to have a maximum retroreflection efficiency for an angle of incidence of approximately 60 degrees.

It is here provided to modify the shape of the microrecesses to, on the one hand, improve the retroreflection efficiency of the screen, and on the other hand control the angle of incidence for which the retroreflection efficiency is maximum to enable to address more varied angles of incidence.

Studies conducted by the inventors have shown that the provision of microrecesses in the form of truncated pyramids enables to increase the retroreflection efficiency with respect to screens of the type described in the above-mentioned patent applications.

Figures 1A, 1B:
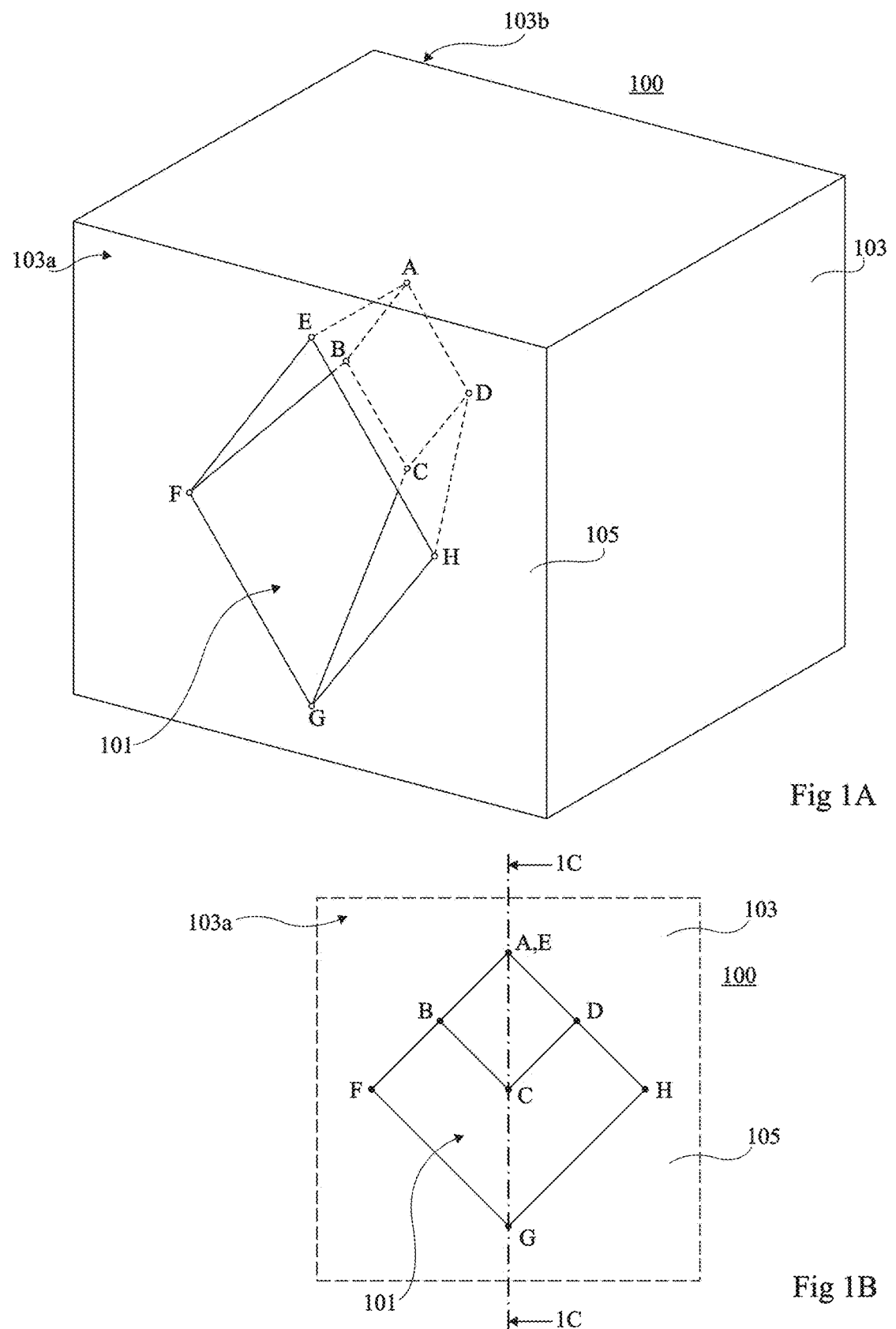
FIG. 1A is a perspective view schematically illustrating an example of a microstructure of a retroreflective screen according to an embodiment.
FIG. 1B is a front view of the microstructure of FIG. 1A.
Figure 1C:
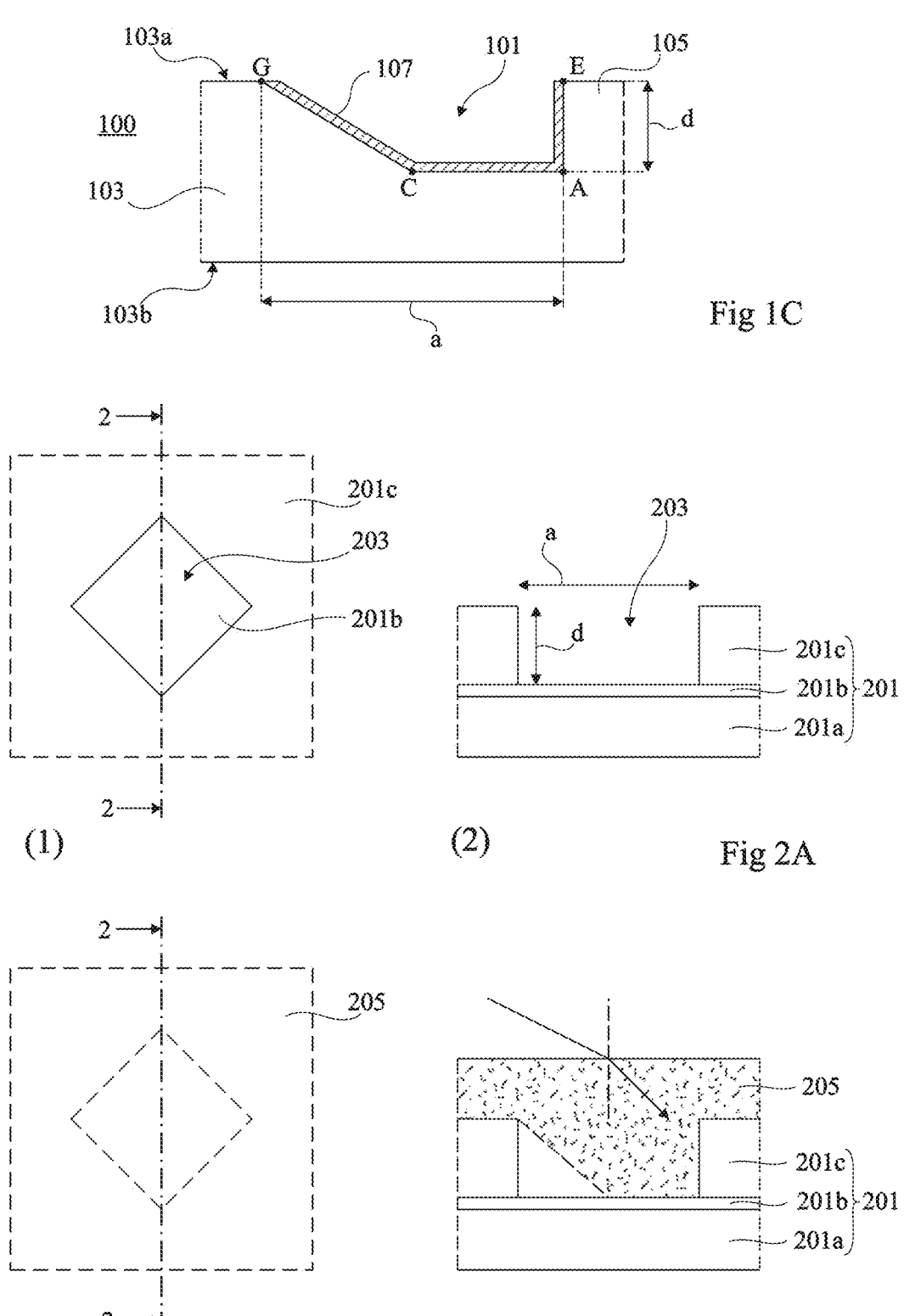
FIG. 1C is a cross-section view of the microstructure along plane 1C-1C of FIG. 1B.

FIGS. 1A, 1B, and 1C schematically show an example of a microrecess 101 of a retroreflective screen 100, in the form of a truncated pyramid. FIG. 1A is a perspective view, FIG. 1B is a front view, and FIG. 1C is a cross-section view along plane 1C-1C of FIG. 1B.

Screen 100 comprises a film 103 comprising a first main surface 103a called front side and a second main surface 103b opposite to surface 103a, called back side. Microrecess 101 is formed in film 103, on the side of surface 103a of the film. In practice, screen 100 may comprise a large number of microrecesses 101, for example, identical or similar, formed on the side of surface 103a of film 103. Screen 100 is intended to be illuminated on the side of surface 103a of film 103. As an example, film 103 is made of a plastic material, for example, of polymethyl methacrylate type. In this example, film 103 is made of a transparent material. Surface 103b of film 103 is for example substantially planar. Each microrecess 101 is laterally surrounded and separated from the other microrecesses by a portion 105 of film 103 where surface 103a of the film is substantially planar and parallel to surface 103b. Portions 105 define transparent regions of the screen, while microrecesses 101 define retroreflective regions of the screen. Thus, screen 100 is partially transparent and partially retroreflective. The rate of occupation of the screen surface by microrecesses 101 defines the screen transparency. To obtain a good transparency enabling to visualize a scene through the screen, the rate of surface coverage of screen 100 by microrecesses 101 is for example smaller than 50%, and preferably smaller than 20%. In this example, the lateral walls and the back of each microrecess 101 are coated with a reflective metal layer 107. For clarity, metal layer 107 has not been shown in FIGS. 1A and 1B and is only visible in FIG. 1C. As shown in FIG. 1C, to preserve the transparency of the screen in regions 105, layer 107 does not cover surface 103a of film 103 at the level of regions 105.

Screen 100 may further comprise a transparent protective film (not shown) bonded on the side of upper surface 103a of film 103, for example by means of a transparent glue layer (not shown) filling microrecesses 101. Preferably, the protective film and the transparent glue have substantially the same refraction index as film 103.

In the example of FIGS. 1A, 1B, and 1C, microrecess 101 has the shape of a truncated pyramid with a quadrilateral base. Respectively call hereafter E, F, G, and H the four vertices of the quadrilateral forming the base of the truncated pyramid, and A, B, C, and D the four vertices of the quadrilateral forming the summit surface of the truncated pyramid, that is, its surface opposite to base EFGH.

Microrecess 101 comprises an aperture defined by base EFGH of the truncated pyramid. Base EFGH is parallel to the mean plane of screen 100, which may be defined as being a plane parallel to surface 103b of film 103. More particularly, in this example, base EFGH is located in the plane of front surface 103a of film 103.

Microrecess 101 further comprises a back defined by the summit surface ABCD of the truncated pyramid. Back ABCD of microrecess 101 is also parallel to the mean plane of the screen.

Microrecess 101 further comprises four lateral walls respectively defined by the surfaces ABFE, ADHE, DCGH, and BCGF of the truncated pyramid. Among these four lateral walls, walls ABFE and ADHE are substantially orthogonal to each other and substantially orthogonal to back ABCD. Walls ABFE and ADHE and back ABCD meet at point A and define a trirectangular trihedron or cube corner having point A as a vertex. The lateral walls DCGH and BCGF of microrecess 101 are inclined, that is, the angle between wall DCGH and back ABCD of microrecess 101 and the angle between wall BCGF and back ABCD of microrecess 101 are both greater than 90 degrees.

Preferably, to obtain a better retroreflection efficiency of microrecess 101, base EFGH and summit surface ABCD of the truncated pyramid are square-shaped. Further, in a preferred embodiment, the length of the side of square EFGH is substantially equal to twice the length of the side of square ABCD. The conducted studies have indeed shown that this dimension ratio between the aperture and the back of the microrecess enables to maximize the retroreflection efficiency of the structure (this enables for the inclined faces of the truncated pyramid do not hinder the vision. They are then substantially in the axis of the user and of the projector in the configuration where the retroreflected intensity is maximum). More generally, the length of the side of square EFGH is preferably smaller than or equal to the length of the side of square ABCD. In these conditions, and designating as d the depth of microrecess 101, that is, the length of edge EA of the truncated pyramid, a width of the aperture of the microrecess, that is, the length of diagonal EG of base EFGH of the truncated pyramid, and n the optical index of the material filling cavity 101, it can be show that the angle of incidence $\alpha i$ for which the retroreflection efficiency of the structure is maximum satisfies the following relation:

$$a = 2d \times \tan\left(\sin^{-1}\left(\frac{1}{n}\sin\alpha i\right)\right) \qquad \text{[Math 1]}$$

For a fixed depth d, the width a to be provided according to the targeted angle of incidence $\alpha i$ can be calculated by this formula. According to the considered application, a screen comprising microrecesses 101 of same depth d but having different widths a, adapted to address different angles of incidence $\alpha i$, may for example be provided.

As an example, for a depth d in the order of 60 μm and in the case where the metallized microrecesses are coated with a protective layer made of a material having an optical index in the order of 1.5, the angle of incidence $\alpha i$ may take a value in the range from 10 to 60 degrees for a length of diagonal a in the range from 14 to 85 μm.

FIGS. 2A to 2E illustrate successive steps of an example of a method of manufacturing a retroreflective screen 100 of the type described in relation with FIGS. 1A, 1B, and 1C. In FIGS. 2A to 2E, the forming of a single microrecess 101 of the screen has been shown, it being understood that, in practice, a large number of microrecesses, for example, identical or similar, may be formed simultaneously. Each of FIGS. 2A to 2E comprises two views (1) and (2). View (1) is a front view of the shown structure, and view (2) is a cross-section view along plane 2-2 of view (1).

Figures 2C, 2D, 2E:
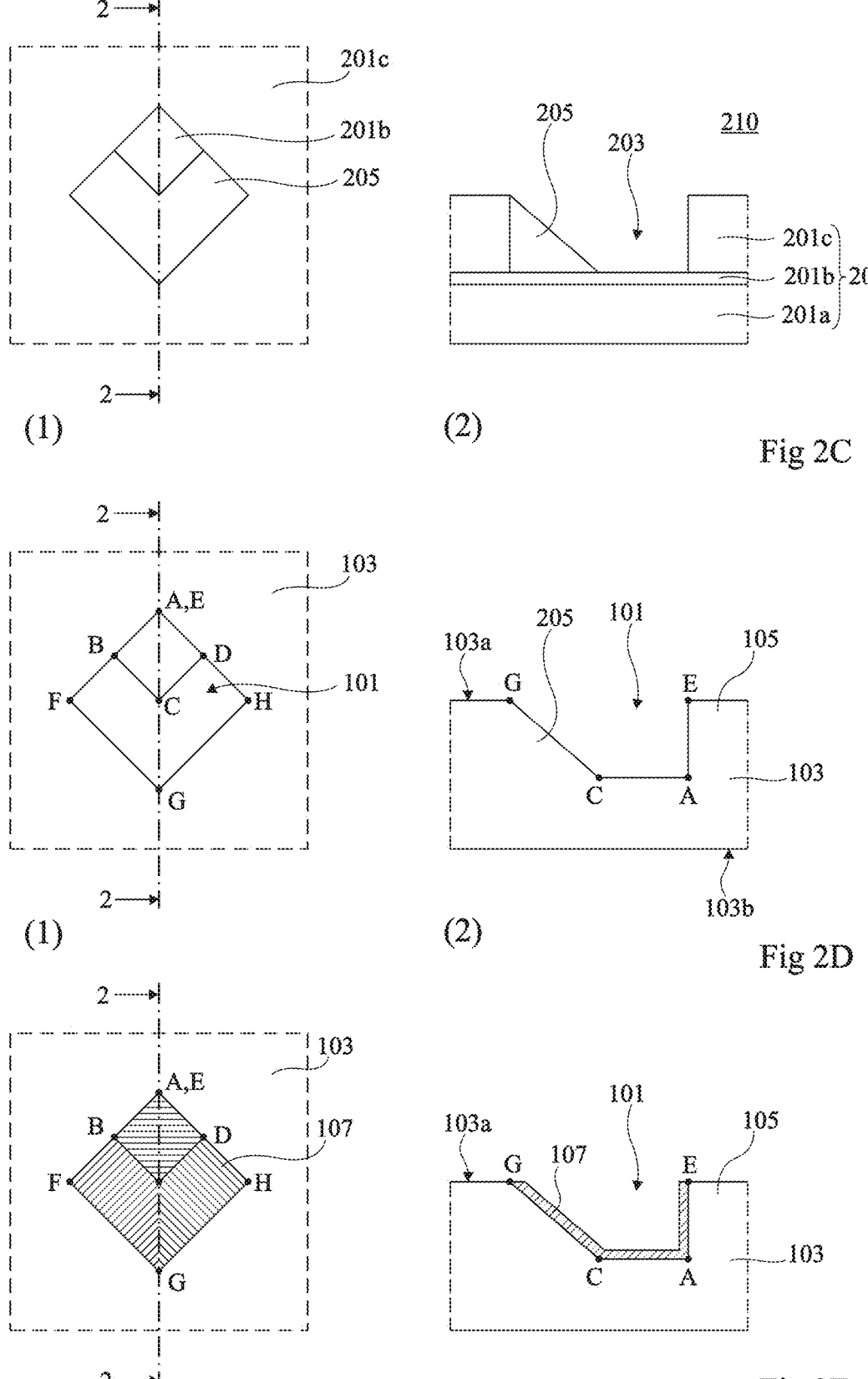
FIG. 2C illustrates another step of this method.
FIG. 2D illustrates another step of this method.
FIG. 2E illustrates another step of this method.

FIGS. 2A, 2B, and 2C illustrate steps of manufacturing of a primary mold 210 intended to be used during the manufacturing of the actual screen 100. FIGS. 2D and 2E illustrate steps of manufacturing of screen 100 from primary mold 210.

FIG. 2A illustrates a step of etching of a cavity 203 on the upper surface side of a substrate 201 where primary mold 210 is desired to be formed. In this example, substrate 201 comprises a stack of a lower support layer 201a, of an intermediate layer 201b, and of an upper layer 201c. In the shown example, the main surfaces of layers 201a, 201b, and 201c are substantially horizontal. Intermediate layer 201b is made of a material such as the material of upper layer 201c to be selectively etchable over layer 201b. As an example, upper layer 201c is made of silicon and intermediate layer 201b is made of silicon oxide. Upper layer 201c is arranged on top of and in contact with the upper surface of intermediate layer 201b. Intermediate layer 201b is for example arranged on top of and in contact with the upper surface of lower support layer 201a. As an example, lower support layer 201a is made of silicon.

The thickness of the upper layer 201c of the substrate defines the depth d of the microrecesses 101 of screen 100. As an example, the thickness of upper layer 201c is in the range from 10 to 500 μm, and preferably in the range from 50 to 200 μm.

Cavity 203 extends vertically from the upper surface of layer 201c and stops on the upper surface of intermediate layer 201b. The etch method used to form cavities 203 is selected to selectively etch the substrate over the material of layer 201b. As an example, cavities 203 are formed by deep reactive ion etching (DRIE). Layer 201b forms an etch stop layer, that is, the etching of cavities 203 stops on the upper surface of layer 201b. Thus, the back of each cavity 203 is formed by the upper surface of layer 201b. An etch mask, not shown, may be arranged on the upper surface of layer 201c during the etching, to define the shape of cavities 203.

In this example, cavity 203 has, in top view, a square shape, having a diagonal length defining the length of the top diagonal EG (distance a) of the microrecess 101 which is desired to be formed. More particularly, cavity 203 has the shape of a cuboid having its square-shaped upper and lower surfaces respectively corresponding to the aperture and to the back of the cavity. The lateral surfaces of the cuboid correspond to the lateral walls of cavity 203 and are substantially orthogonal to the upper and lower surfaces of substrate 201.

FIG. 2B illustrates a step of deposition of a resist layer 205 on the upper surface of the structure obtained at the end of the etch step of FIG. 2A. The thickness of resist layer 205 is greater than or equal to the depth d of cavity 203, so that resist 205 totally fills cavity 203. In the shown example, the thickness of resin layer 205 is greater than the depth of cavity 203.

FIG. 2B further illustrates a step subsequent to the deposition of resist 205, during which resist 205 is illuminated with an illumination angle corresponding to the angle of incidence $\alpha i$ for which it is desired for the retroreflection efficiency of the microrecess 101 which is desired to be formed to be maximum. As illustrated in FIG. 2B, the angle of incidence of the light beam of illumination of resist 205 associated with the opacity of the upper layer 201c of the substrate creates a shadow in cavity 203, at the level of the two lower lateral walls (in the orientation of view (1) of FIG. 2B) of cavity 203. Thus, a portion of resist 205 is not illuminated inside of cavity 203. In view (2) of FIG. 2B, the illuminated region of layer 205 is shown with a texturing, while the non-illuminated region of layer 205 is shown with no texturing, the two regions being separated by a dash line.

FIG. 2C illustrates the structure obtained at the end of a step of development of resist layer 205. In this example, resist 205 is a negative resist. Thus, during the development step, only the non-illuminated portion of the resist is kept. The illuminated portion is dissolved and removed by means of a chemical development solution. The remaining portion of resist 205 partially fills cavity 203.

At this stage, cavity 203 has the same truncated pyramid shape as the microrecess 101 which is desired to be formed. In particular, the remaining portion of resist 205 defines the inclined surfaces BCGF and DCGH of the truncated pyramid.

The structure obtained at the end of the steps of FIGS. 2A, 2B, and 2C corresponds to a primary mold 210 intended to be used for the manufacturing of screen 100.

FIG. 2D illustrates a step during which the structures of the upper surface of primary mold 210 are replicated, by molding, on surface 103a (corresponding to the upper surface in the orientation of FIG. 2D) of film 103. The replication of the patterns of primary mold 210 of surface 103a of film 103 requires forming, from primary mold 210, a secondary mold (not shown) having a shape complementary to that of primary mold 210, that is, having protrusions in the form of truncated pyramids complementary to the cavities 203 of primary mold 210. The structures of surface 103a of film 103 are then obtained, from the secondary mold, by thermoforming or by any other adapted molding technique. As an example, the secondary mold may be made of a metal or of a plastic material having a deformation temperature greater than that of film 103.

FIG. 2E illustrates a step of forming of a reflective metallization 107 on the lateral walls and on the back of microrecess 101. Metallization 107 is for example made of aluminum. As an example, to form metallization 107, a reflective metal layer is deposited, by a conformal deposition method, for example, by sputtering, all over the upper surface 103a of film 103, that is, not only on the lateral walls and on the back of microrecesses 101, but also on the upper surface of the regions 105 of film 103 laterally separating microrecesses 101 from one another. The deposited metal may then be removed at the level of regions 105 by chemical-mechanical polishing. During this step, only the portions of the metal layer coating the lateral walls and the back of microrecesses 101 are kept, forming reflective metallizations 107.

A screen 100 comprising retroreflective portions regularly distributed across its entire surface, corresponding to the metallized microrecesses of film 103, is thus obtained. Each retroreflective screen portion is surrounded and separated from the other retroreflective portions by a transparent screen portion. The transparent screen portions correspond to the non-structured regions 105 of film 103.

Once metallizations 107 have been deposited, a step of bonding of a transparent protection film (not shown) on the upper surface 103a of film 103 may possibly be provided, for example, by means of a transparent glue layer (not shown) filling microrecesses 101, such as described in relation with FIGS. 9A and 9B of the above-mentioned patent applications US2017059862 and US2017197338.

An advantage of the above-described screen is that it has a very good retroreflection efficiency at the angle of incidence αi for which microrecesses 101 have been sized. Further, the control of the angle of incidence αi for which the retroreflection efficiency is maximum is easy to form, since this angle directly depends on the length of diagonal a of the entrance aperture of the microrecesses. One may in particular easily form a screen comprising distinct retroreflective portions having a maximum retroreflection efficiency for distinct angles of incidence αi.

Another advantage of the above-described screen 100 is that, for a given retroreflection efficiency, it enables to decrease the surface area occupied by the retroreflective microrecesses and thus to increase the transparency of the screen with respect to screens of the type described in the above-mentioned patent applications.

Another advantage of the above-described screen 100 is that its forming is eased by the fact that each microrecess 101 has two inclined lateral walls BCGF and DCGH. This particularly enables to ease the removal of film 103 from the mold during the molding step described in relation with FIG. 2D.

In most applications, and particularly in applications of projection of an image on a vehicle windshield, the light source illuminating the retroreflective screen is not placed exactly in the user's gaze axis. Thus, screen 100 should preferably be capable of scattering the retroreflected light in a scattering cone encompassing the user's pupils. Diffraction effects on the edges of the microrecesses and/or unavoidable surface unevennesses of the screen may be sufficient to obtain the required scattering effect. To amplify and/or control this scattering, the roughness of the sides and of the back of the cavities 203 of primary mold 210 may for example be varied. As a variant, a method of the type described in relation with Figures IIa to 11G of the above-mentioned patent application US2017197338 may be used to form a controlled scattering pattern at the back of the cavities 203 of primary mold 210.

It should be noted that in the retroreflective structure defined by the microrecess 101 of screen 100, the inclined walls corresponding to the surfaces BCGF and DCGH of the truncated pyramid do not take part in the retroreflection at the angle of incidence αi for which the structure has been sized. To avoid parasitic reflections, it may be provided to degrade the reflection on these surfaces. For this purpose, an optional microstructuring step resulting in increasing the roughness of the surface of resist 205 may be provided at the end of the steps described in relation with FIGS. 2A, 2B, and 2C.

Figure 3:
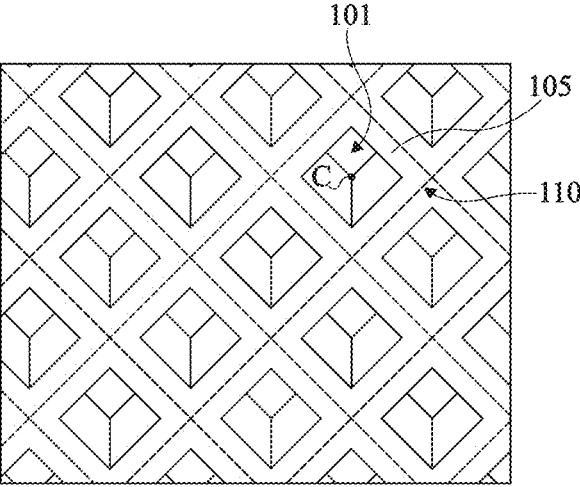
FIG. 3 is a partial simplified top view of an example of a retroreflective screen according to an embodiment.
Figure 4:
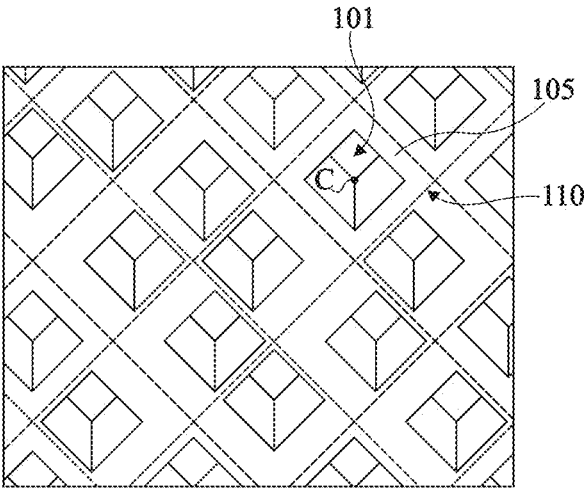
FIG. 4 is a partial simplified top view of another example of a retroreflective screen according to an embodiment.
Figure 5:
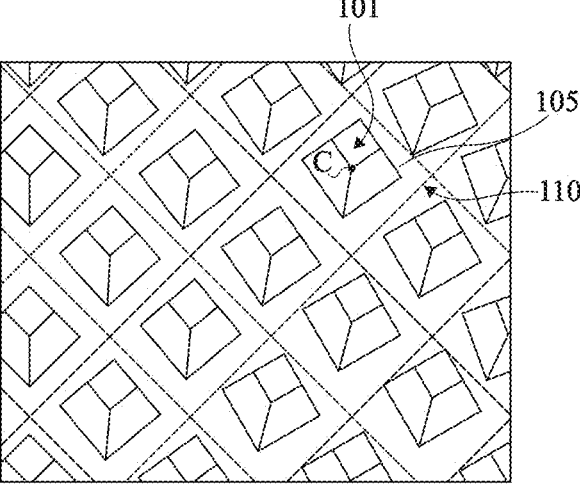
FIG. 5 is a partial simplified top view of another example of a retroreflective screen according to an embodiment.

FIGS. 3, 4, and 5 are top views respectively illustrating three examples of distribution of microrecesses 101 in a screen 100 of the above-described type. For clarity, reflective metallizations 107 have not been shown in FIGS. 3, 4, and 5.

In the examples of FIGS. 3, 4, and 5, microrecesses 101 all have the same dimensions. In top view, the screen may be decomposed into a plurality of cells 110 of same dimensions arranged in an array of rows and columns. Each cell comprises a single microrecess 101, laterally surrounded with a non-structured region 105. In this example, cells 110 have, in top view, a square shape.

In the example of FIG. 3, microrecesses 101 are distributed in a regular array layout. More particularly, in this example, in top view, each microrecess 101 is arranged at the center of the cell 110 to which it belongs. In other words, point C of the back of each microrecess 101 substantially coincides, in top view, with the center of cell 110.

In the example of FIG. 4, microrecesses 101 have a random distribution within a fixed grid. More particularly, in this example, in top view, the positions of the different microrecesses 101 within their respective cells 110 vary according to a random or pseudo-random distribution.

In the example of FIG. 5, the screen comprises microrecesses 101 of different orientations, which enables, for a given angle of incidence, to address distinct planes of incidence. More particularly, in this example, in top view, each microrecess 101 is arranged at the center of the cell 110 to which it belongs, but the orientation of the microrecess with respect to the cell varies according to the position of the cell in the array.

To form a screen of large dimensions, a plurality of molds of the type obtained by the method described in relation with FIGS. 2A to 2E may be juxtaposed. According to the constraints of the application, it may in particular be provided to juxtapose molds having different properties, particularly different microrecess sizes and/or orientations, to address different angles of incidence or planes of incidence.

Figure 6:
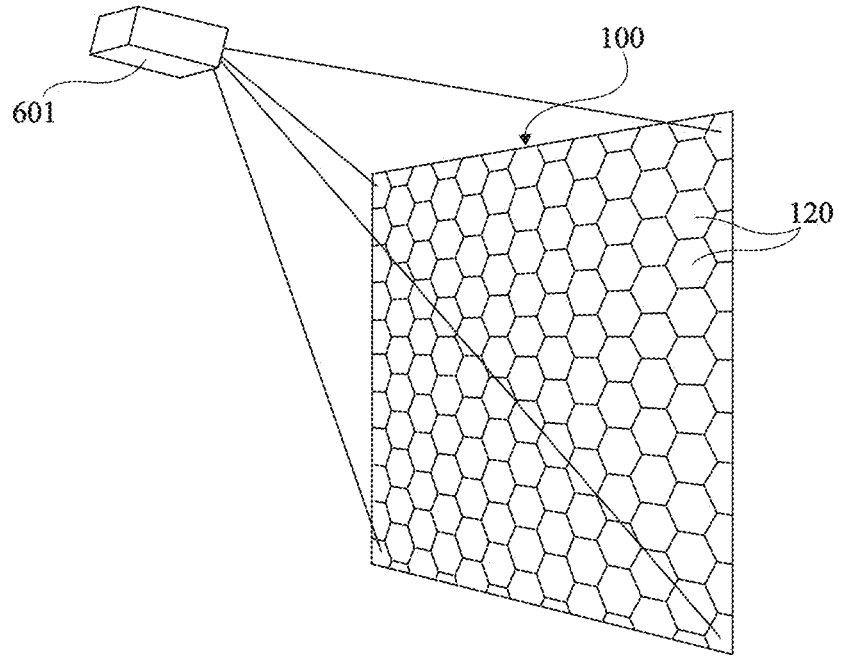
FIG. 6 schematically illustrates a system of projection of an image on a retroreflective screen according to an embodiment.

FIG. 6 schematically illustrates a system of projection of an image on a retroreflective screen 100 of the above-described type.

The screen 100 of the system of FIG. 6 for example has a substantially rectangular general shape. The system of FIG. 6 comprises a projector 601 arranged to project an image on substantially the entire surface of screen 100.

In the example of FIG. 6, the screen may be decomposed in a plurality of juxtaposed areas 120. In the shown example, the areas 120 all substantially have the same hexagonal shape and substantially the same dimensions, and are juxtaposed according to a honeycomb distribution.

A preferred angle of incidence and a preferred orientation of incidence may be associated with each area 120. Within each area 120, microrecesses 101 all have substantially the same dimensions and the same orientation, selected according to the angle of incidence and to the main orientation of incidence of area 120. The microrecesses 101 of different areas 120 may however have different dimensions and/or different orientations.

Figure 7:
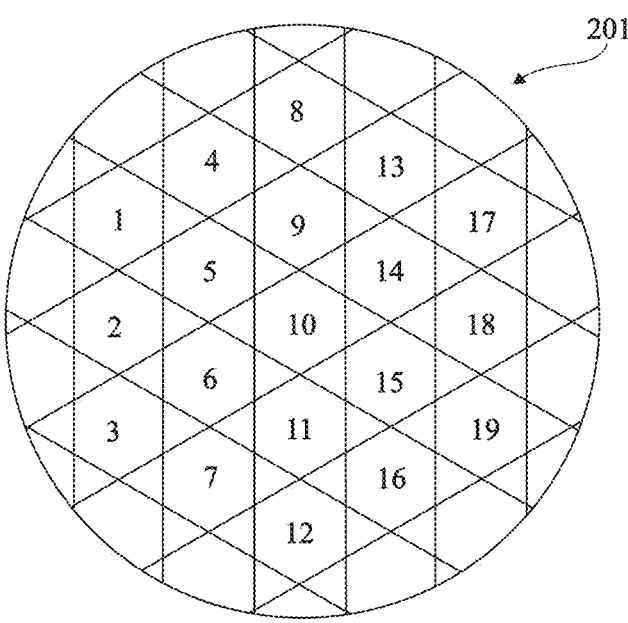
FIG. 7 schematically illustrates an example of embodiment of a mold for the manufacturing of a retroreflective screen according to an embodiment.

FIG. 7 schematically illustrates an example of embodiment of a mold for the manufacturing of a screen of the type described in relation with FIG. 6. In this example the mold is formed from a substrate 201 of circular general shape, according to a method identical or similar to what has been described in relation with FIGS. 2A to 2C. In this example, a plurality of elementary cells are defined in the mold, respectively corresponding to the different areas 120 of screen 100. In the shown example, 19 elementary cells numbered from 1 to 19 are formed. In this example, elementary cells 1 to 19 all have substantially the same hexagonal shape and the same dimensions, corresponding to the shape and to the dimensions of the areas 120 of the screen 100 of FIG. 6.

As an example, the microrecesses of the elementary cells all have the same orientation but have different dimensions, which enables, in this example, to address 19 distinct angles of incidence αi.

Substrate 201 is then cut to separate from one another the different elementary cells. In FIG. 7, the cutting paths have been shown by rectilinear full lines.

After the cutting, each elementary cell may be oriented according to 6 different orientations, which enables to address 6 different orientations of incidence for each angle of incidence αi.

The elementary cells may thus be assembled to form projection surfaces adapted to various applications.

Figure 8:
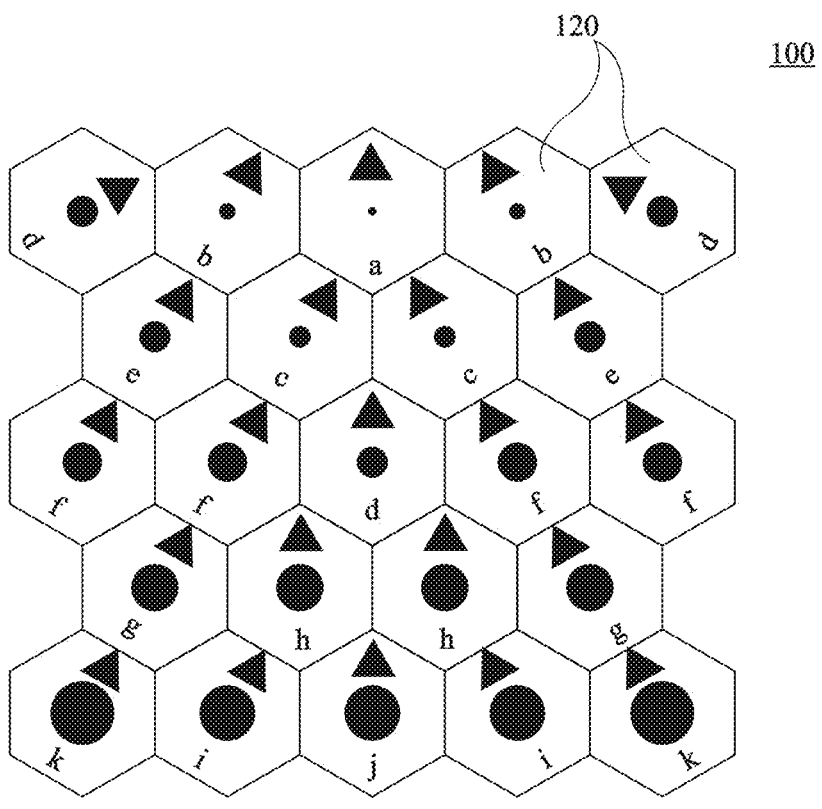
FIG. 8 illustrates in further detail an example of embodiment of a retroreflective screen of the type described in relation with FIG. 6.

FIG. 8 illustrates in further detail an example of a retroreflective screen 100 of the type described in relation with FIG. 6, formed by means of a mold formed by assembly of elementary cells of the type described in relation with FIG. 7. In this example, 11 types of elementary cells have been used, corresponding to the areas 120 respectively designated with letters a, b, c, d, e, f, g, h, i, j, and k in FIG. 8. In each area 120, a black dot has been shown, having its size schematizing the dimensions of the microrecesses 101 in the area. Further, in each area 120, a black arrow has been shown, having its orientation schematizing the orientation of the microrecesses 101 in the area.

Specific scattering properties may further be associated with each area 120. As an example, within each area 120, microrecesses 101 all substantially have the same scattering properties, selected according to the position of area 120 on the screen. The microrecesses of different areas 120 may however have different scattering properties.

Various embodiments and variants have been described. Those skilled in the art will understand that certain features of these embodiments can be combined and other variants will readily occur to those skilled in the art. In particular, the described embodiments are not limited to the application to the projection of an image on a transparent surface. In particular, the described embodiments may have applications in various fields using retroreflective surfaces, not necessarily transparent, for example, for signaling purposes. In certain cases, it may indeed be desirable to have a surface with a good retroreflection efficiency for various angles of incidence. In the case where the transparency is not desired, it will preferably be desired to maximize the screen surface coverage by the retroreflective portions. Further, the material of film 103 may be non-transparent. Further, if the screen transparency is not required, reflective metallizations 107 are not necessarily located on the lateral walls and on the back of microrecesses 101, but may form a continuous layer formed by conformal deposition and coating the entire surface 103*a* of film 103.

It should be noted that in the present description, the term film has been used to designate element 103 of screen 100. This term should however be understood in a wide sense, and particularly includes elements similar to films such as sheets, plates, etc.

The invention claimed is:

1. Retroreflective screen comprising a film having a surface comprising a plurality of microrecesses, each microrecess having a shape of a truncated pyramid comprising first, second, third and fourth lateral walls corresponding respectively first, second, third and fourth lateral surfaces of the truncated pyramid, and a back surface parallel to the mean plane of the screen, corresponding to a summit surface of the truncated pyramid, wherein:

in each microrecess, the first and second lateral walls are orthogonal to each other and orthogonal to the back surface; and the first, second, third and fourth lateral walls and the back surface of each microrecess are coated with a reflective metallization, wherein:

A) the screen is divided into a plurality of cells of same dimensions arranged in an array of rows and columns, each cell comprising a single microrecess and the microrecesses all having the same dimensions, the positions of the microrecesses within their respective cells varying according to a random or pseudo-random distribution, or orientations of the microrecesses within their respective cells varying according to a position of the cell in the array; or B) the screen has a plurality of areas, each comprising a plurality of microrecesses, the microrecesses of a same area being of the same dimensions and the microrecesses of different areas having different dimensions.

2. The retroreflective screen according to claim 1, wherein, in each microrecess, the third and fourth lateral walls are inclined with respect to the mean plane of the screen.

3. The retroreflective screen according to claim 1, wherein each microrecess has an entrance aperture corresponding to the base of the truncated pyramid.

4. The retroreflective screen according to claim 1, wherein the base of the truncated pyramid is square-shaped.

5. The retroreflective screen according to claim 4, wherein the summit surface of the truncated pyramid is square-shaped.

6. The retroreflective screen according to claim 5, wherein a length of a side of the base of the truncated pyramid is substantially equal to twice the length of the side of the summit surface of the truncated pyramid.

7. The retroreflective screen according to claim 1, wherein the microrecesses all have substantially a same depth.

8. The retroreflective screen according to claim 1, wherein each microrecess is surrounded and laterally separated from the other microrecesses by a non-structured region of the film.

9. The retroreflective screen according to claim 8, wherein the reflective metallization does not extend above said non-structured region of the film.

10. The retroreflective screen according to claim 1, wherein the film is made of a transparent material.

11. The retroreflective screen according to alternative B of claim 1, wherein the areas all are of same hexagonal general shape and of same dimensions.

12. Mold for the manufacturing of the retroreflective screen according to claim 1, comprising, on a side of a surface, cavities of same shape as the microrecesses of the film of the screen.

13. Method of manufacturing the mold according to claim 12, comprising the successive steps of: forming parallelepipedal cavities on a side of a surface of a substrate;

filling the cavities with resist;

illuminating the resist by means of a light beam inclined with respect to the back of the parallelepipedal cavities, so that part of the resist does not see the illumination beam; and removing the illuminated portion of the resist.

14. Method of manufacturing a retroreflective screen comprising a film having a surface having a plurality of microrecesses, each microrecess having a shape of a truncated pyramid, lateral walls and back of each microrecess being coated with a reflective metallization, comprising a step of molding of said surface of the film by means of the mold according to claim 12, followed by a step of deposition of a reflective metal layer all over said surface of the film.

15. The method according to claim 14, further comprising a step of removal of the reflective metal layer outside of the microrecesses, by chemical-mechanical polishing.

\* \* \* \* \*